US011358309B2

(12) United States Patent
Reese et al.

(10) Patent No.: US 11,358,309 B2
(45) Date of Patent: Jun. 14, 2022

(54) METHOD AND SYSTEM FOR CREATING THREE-DIMENSIONAL PREFORMS FOR USE IN COMPOSITE PARTS

(71) Applicant: Arris Composites Inc., Berkeley, CA (US)

(72) Inventors: Riley Reese, Carpinteria, CA (US); Ethan Escowitz, Berkeley, CA (US); Erick Davidson, Piedmont, CA (US); J. Scott Perkins, Berkeley, CA (US)

(73) Assignee: Arris Composites Inc., Berkeley, CA (US)

( * ) Notice: Subject to any disclaimer, the term of this patent is extended or adjusted under 35 U.S.C. 154(b) by 41 days.

(21) Appl. No.: 16/659,243

(22) Filed: Oct. 21, 2019

(65) Prior Publication Data

US 2020/0122358 A1    Apr. 23, 2020

Related U.S. Application Data

(60) Provisional application No. 62/747,777, filed on Oct. 19, 2018.

(51) Int. Cl.
*B29B 11/00* (2006.01)
*B29B 11/16* (2006.01)
(Continued)

(52) U.S. Cl.
CPC .............. *B29B 11/16* (2013.01); *B29B 11/02* (2013.01); *B29B 11/08* (2013.01)

(58) Field of Classification Search
CPC ......... B29C 11/00; B29C 11/02; B29C 11/08; B29C 11/10; B29C 11/16
See application file for complete search history.

(56) References Cited

U.S. PATENT DOCUMENTS 9,486,927 B1 * 11/2016 Morey ................ B25J 15/0061
2013/0014367 A1 * 1/2013 Miller ...................... B64F 5/40
29/402.08

(Continued)

FOREIGN PATENT DOCUMENTS

DE          3906287 A1    8/1990
WO    2015/049474 A1    4/2015

OTHER PUBLICATIONS

Authorized Officer Saida Isliy, International Search Report issued in PCT Application No. PCT/US2019/057271 dated Jan. 23, 2020.
(Continued)

*Primary Examiner* — Jacob T Minskey
*Assistant Examiner* — Matthew Hoover
(74) *Attorney, Agent, or Firm* — Kaplan Breyer Schwarz, LLP

(57) ABSTRACT

An ultrasonic manipulator for processing three-dimensional composite preforms is provided, including at least one end effector, the end effector having an ultrasonic cutting device, an ultrasonic machining device, an ultrasonic inspecting device, and an ultrasonic bonding device. A method for creating three-dimensional preforms for use in molding composite parts is also provided, and includes the steps of grasping a preform/towpreg, inspecting the composite object using ultrasound, cutting a preform from the composite object using ultrasound, and at least some of the steps of shaping the preform using ultrasound, machining the preform using ultrasound, assembling a plurality of preforms, bonding the assembled preforms together to create a preform charge, and placing the preform charge in an injection mold.

5 Claims, 5 Drawing Sheets

(51) Int. Cl.
*B29B 11/02* (2006.01)
*B29B 11/08* (2006.01)

(56) References Cited

U.S. PATENT DOCUMENTS

2018/0290393 A1* 10/2018 Bloch .................... B25J 11/005
2018/0345604 A1 12/2018 Escowitz

OTHER PUBLICATIONS

Office Action issued in European patent application No. 19801455.7, dated Mar. 30, 2022, 4 pp.

* cited by examiner

METHOD AND SYSTEM FOR CREATING THREE-DIMENSIONAL PREFORMS FOR USE IN COMPOSITE PARTS

CROSS REFERENCE TO RELATED APPLICATIONS

This application claims priority to U.S. Provisional Application No. 62/747,777, entitled Method and System for Creating Preforms for Use in Composite Parts, filed Oct. 19, 2018, the entire disclosure of which is incorporated by reference herein.

FIELD OF THE INVENTION

The present invention relates to fiber composite parts. More particularly, the present invention relates to creating three-dimensional preforms for use in molding fiber composite parts.

BACKGROUND OF THE INVENTION

Composite materials are, by nature, tough and abrasive. As such, it is challenging to cut and form these materials into shapes to create products. Standard cutting methods for composites often use carbide blades. Although carbide blades are capable of cutting composite material, the cut surfaces are often distorted as a result of the shear introduced in the cutting process. Furthermore, carbide materials wear when cutting composites, and need to be replaced periodically.

Rotary cutting methods can also be used, but these methods generate significant debris and airborne particulates. The composite particulates can be hazardous to inhale and can cause skin irritation, so a targeted exhaust system is needed to collect and filter the particulates. More recently, ultrasonic cutters have been used to cut composites. Ultrasonic cutting enables clean cuts to be made without requiring high forces. This results in less wear on the cutting blades and distortion of the cut surfaces. In the past, this method, however, has only been used to cut flat, two-dimensional sheets or fabrics; it has not been used to cut relatively thick composite tapes or fiber bundles—essentially "3D" forms—.

A need therefore remains for a technique to cut 3D shapes as part of the manufacturing process of composite products.

SUMMARY OF THE INVENTION

An ultrasonic manipulator is provided for processing three-dimensional composite preforms, where the ultrasonic manipulator includes at least one end effector. The end effector includes an ultrasonic cutting device, an ultrasonic machining device, an ultrasonic inspecting device, and an ultrasonic bonding device. The end effector may include a pair of paddles. The ultrasonic manipulator may include a pick-and-place system. The end paddles may include at least one sonotrode, transmitter and receiver. The end effector may include a milling tool head.

A method for creating three-dimensional preforms for use in molding composite parts is also provided. The method includes the steps of grasping a preform/towpreg, inspecting the composite object using ultrasound, and cutting a preform from the composite object using ultrasound. All steps must be performed by a single end effector. A step of shaping the preform using ultrasound may be included. A step of machining the preform using ultrasound may be included.

The method may further include the steps of assembling a plurality of preforms, bonding the assembled preforms together to create a preform charge, and placing the preform charge in an injection mold. A step of inspecting the preform, and scrapping the preform if it fails to meet inspection requirements may be also included. The step of inspecting may be to detect voids, inclusions and cracks in the preform.

Additional embodiments of the invention comprise any other non-conflicting combination of features recited in the above-disclosed embodiments and in the Detailed Description below.

BRIEF DESCRIPTION OF THE DRAWINGS

The invention will be described in conjunction with the following drawings in which like reference numbers refer to like elements throughout the views, and wherein.

DETAILED DESCRIPTION

Definitions

The following terms are defined for use in this description and the appended claims:

"Composite Part" means a part made from composite material made from two or more constituent materials with significantly different physical or chemical properties that, when combined, produce a material with characteristics different from the individual components. The individual components remain separate and distinct within the finished structure.

"Fiber" means an individual strand of material. A fiber has a length that is much greater than its diameter. In the context of composites, fibers are classified as (i) chopped/cut/discontinuous or (ii) continuous. Continuous fibers have a length that is comparable to the size of the part in which they are used. Continuous fibers usually have a defined orientation in the matrix or part. Orientation of the fibers in a part has a direct correlation to the material properties of the part, including, but not limited to strength, weak areas, warping, etc. Chopped fibers have a length that is typically much shorter than the part in which they are used and, in fact, the length of such fibers typically bear no predefined relationship to the length of any feature of a mold/part. Chopped fibers have a random orientation in the matrix or final part. As used herein, the term "fiber" means continuous fiber, unless modified by the term "chopped" or "cut".

"Prepreg" means fibers that are impregnated with resin.

"Towpreg" means a fiber bundle (i.e., a tow) that is impregnated with resin.

"Preform" means altered (e.g., bent, sized, etc.) extrudate filament that is a pre-shaped fibrous reinforcement part formed to the approximate contour and thickness desired in the finished part before being placed in a mold press. The cross section of the extrudate filament has an aspect ratio (width:thickness) of between about 0.25 to about 6. The term preform explicitly excludes sized/shaped tape (which typically has an aspect ratio—cross section, as above—of between about 10 to about 30), (ii) woven mats/sheets of fiber, and (iii) laminates.

"Preform Charge" means an assemblage of preforms that are at least loosely bound together so as to maintain their position relative to one another. Preform charges can contain fiber in form factors other than that of fiber bundles, and can contain various inserts, passive or active.

"About" or "Substantially" means+/−20% with respect to a stated figure or nominal value.

The present invention provides a system that is capable of cutting, assembling, machining, bonding, and inspecting three-dimensional preform composite shapes in a repeatable and reliable manner. Prior to this invention, there was no means to cut 3D composite shapes in a reliable, repeatable manner, nor was there a system that could provide all of the aforementioned functionality.

Figure 1:
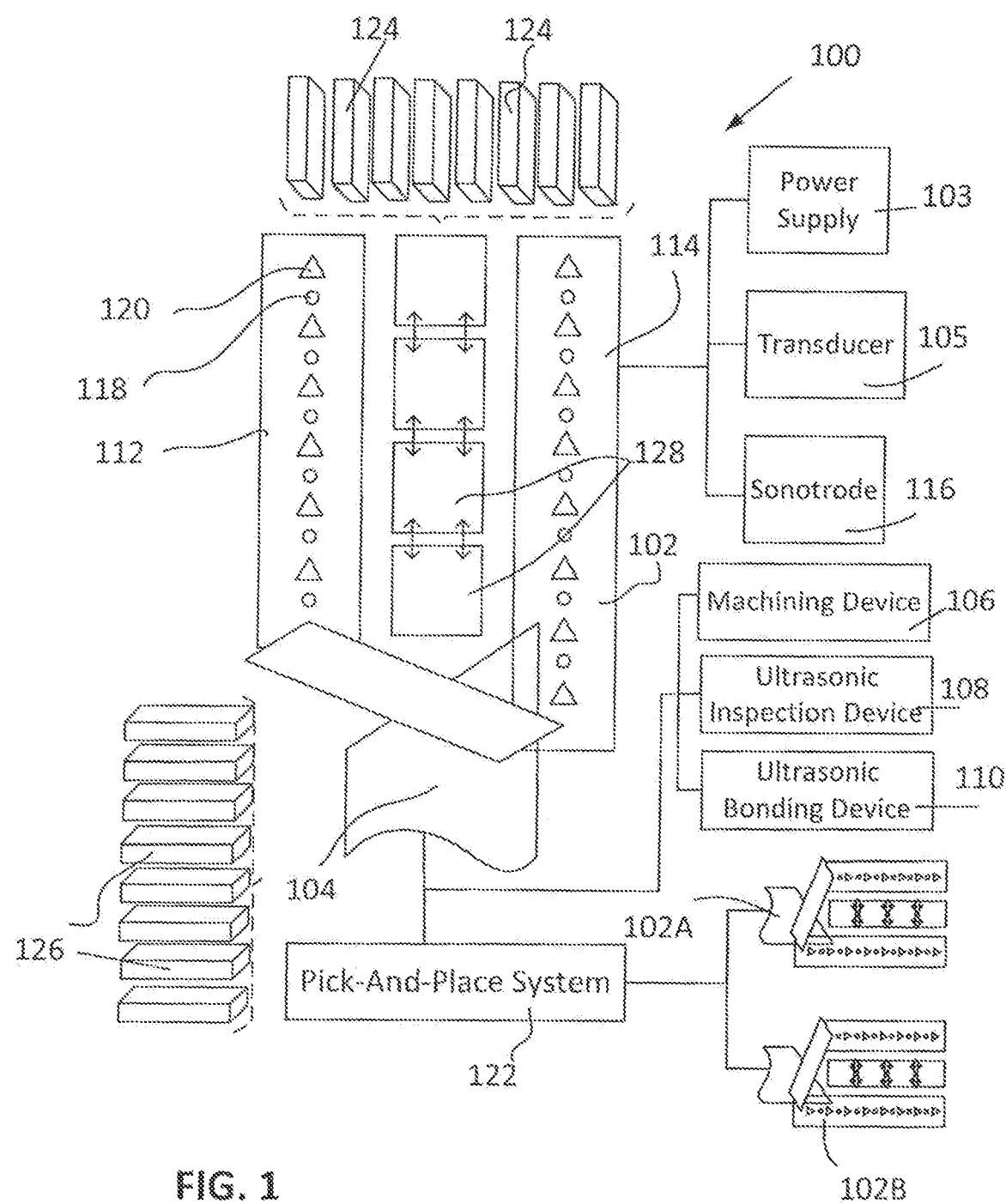
FIG. 1 depicts a simplified schematic view of an ultrasonic manipulator for creating preforms in accordance with an exemplary embodiment of the present invention.
Figure 2:
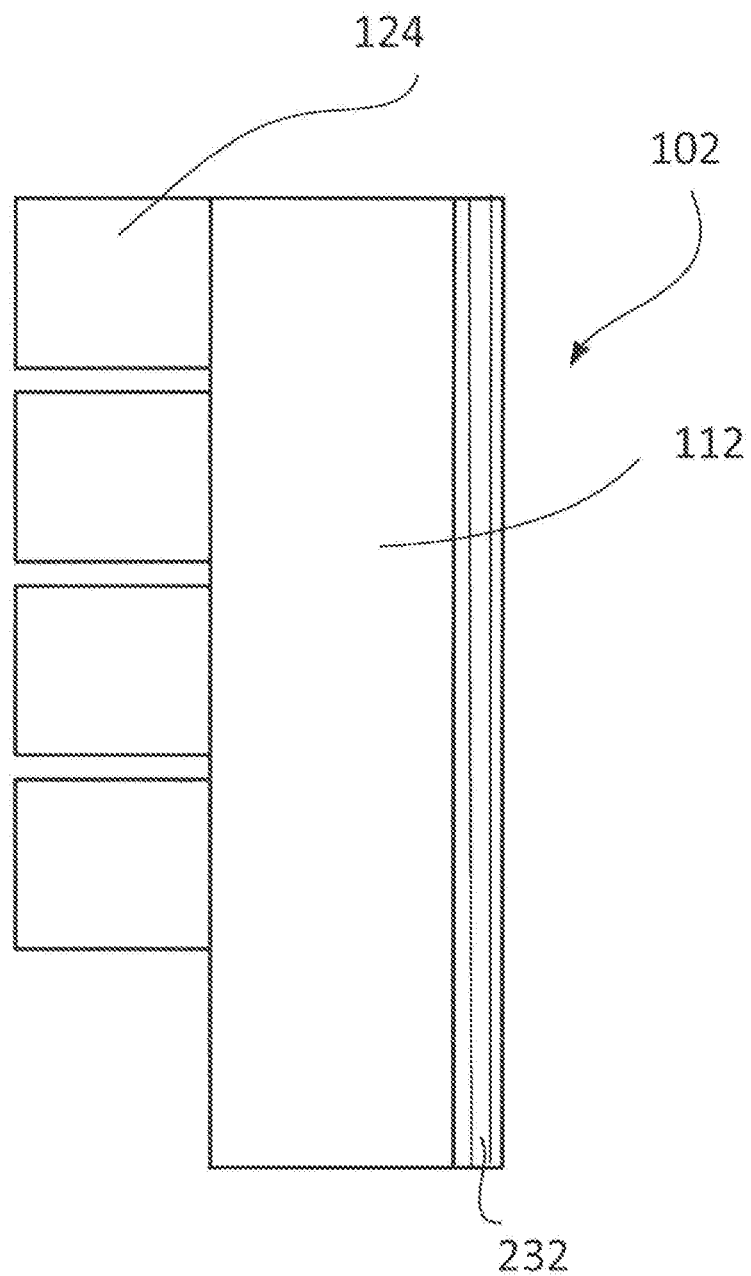
FIG. 2 depicts a simplified schematic side view of an end effector for the ultrasonic manipulator of FIG. 1.

Referring now to the drawing figures wherein like reference numbers refer to like elements throughout the several views, there is shown in FIG. 1 an ultrasonic manipulator 100 for processing three-dimensional composite preforms in accordance with an exemplary embodiment of the present invention. The ultrasonic manipulator 100 includes at least one end effector 102 having a multi-function capability. See FIGS. 2-4. The end effector 102 may include an ultrasonic cutting device 104, a machining device 106 (e.g. a milling tool head or ultrasonic machining device), an ultrasonic inspecting device 108, and an ultrasonic bonding device 110. Additionally, the ultrasonic manipulator 100 is capable of assembly of preforms and/or preform charges.

Figure 3:
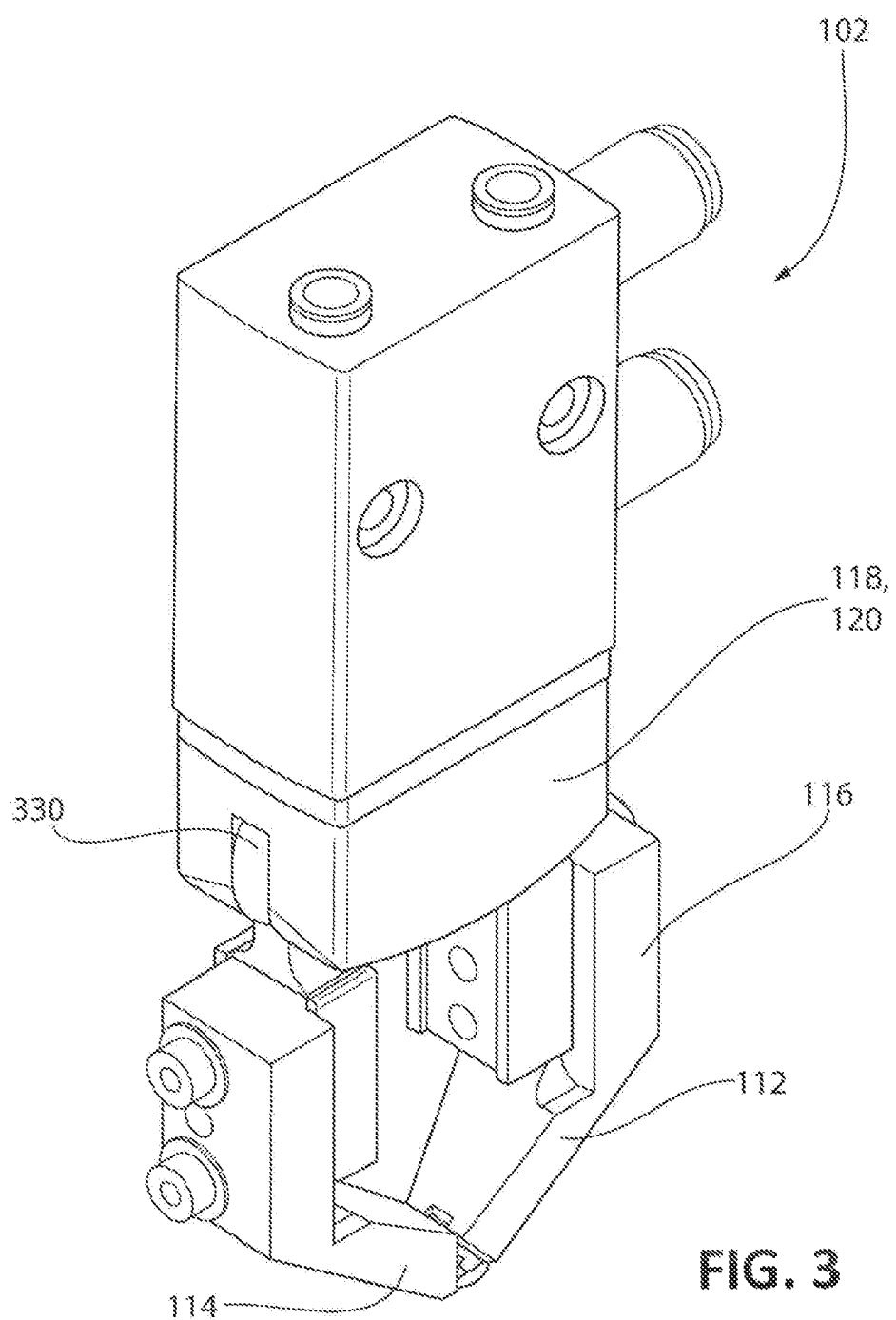
FIG. 3 depicts an isometric view of an exemplary end effector of the ultrasonic manipulator of FIG. 1.
Figure 4:
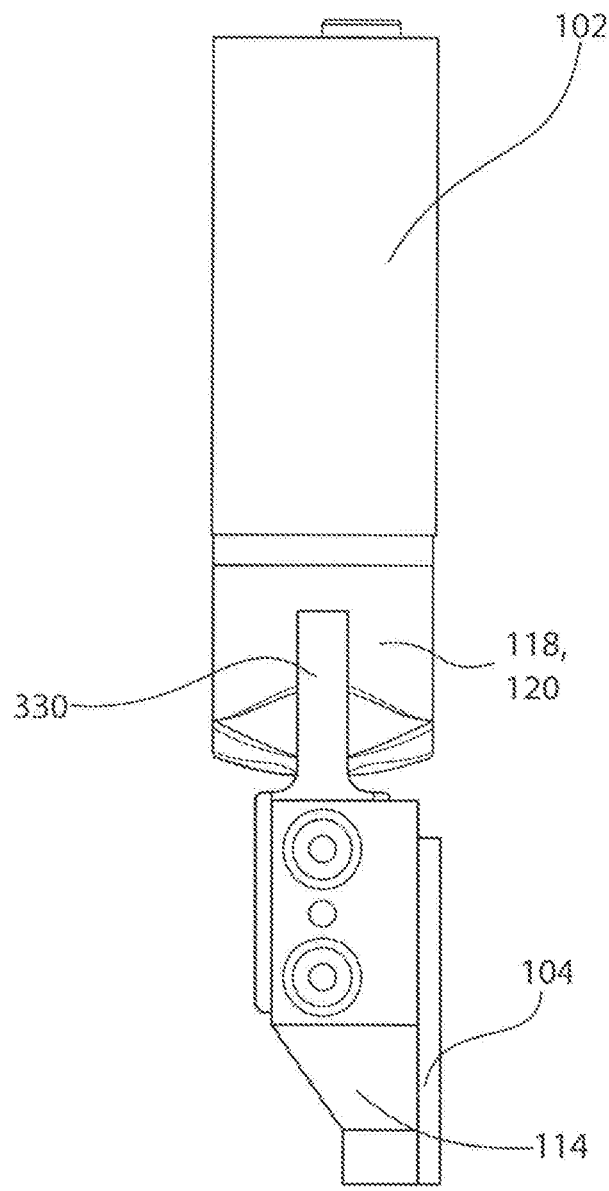
FIG. 4 depicts a front view of the end effector of FIG. 3.

Preferably, the end effector 102 is a pair of paddles 112, 114 having one or more sonotrodes 116, transmitters 118, and receivers 120 (see, e.g., FIG. 3). However, any end effector 102 capable of performing the various functions described herein is intended to be within the scope of the present invention. The end effector 102 is preferably disposed on a pick-and-place machine 122 (as are well known).

The ultrasonic manipulator 100 is preferably a single unit including a power supply 103 and transducer 105, and which is capable of cutting, assembling, bonding and inspecting preforms. In the illustrative embodiment, the ultrasonic manipulator includes the end effector 102, situated on the pick-and-place system 122 (e.g., SCARA, 6-axis robot, X,Y gantry, etc.). The machining device 106 may be incorporated into the end effector 102 or otherwise associated with it.

Figure 5:
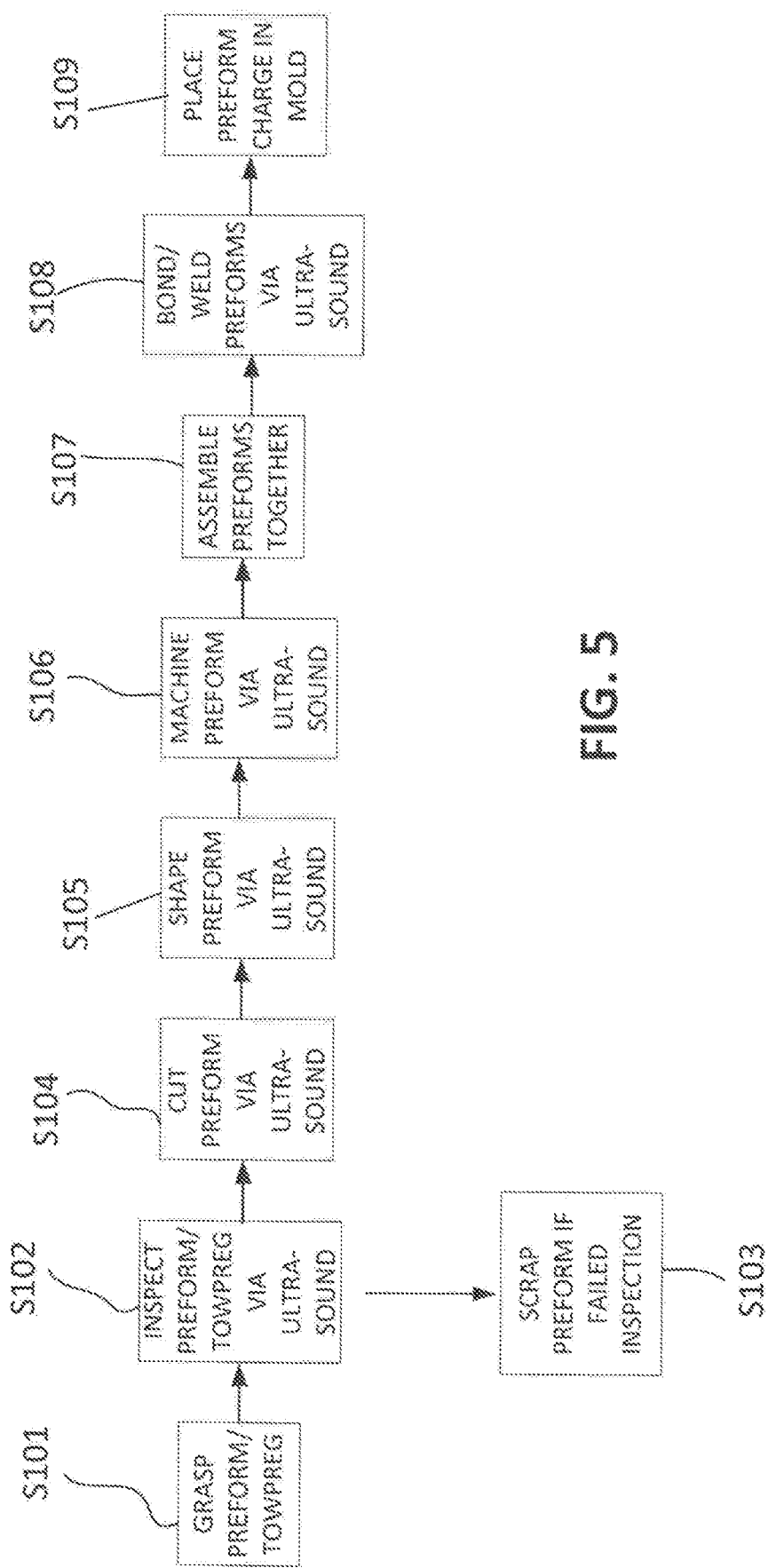
FIG. 5 is a flow chart of a method for creating preforms for use in molding composite parts in accordance with an exemplary embodiment of the present invention.

The exemplary ultrasonic manipulator 100, with its multi-function end effector 102 may operate to create three-dimensional preforms 124 and/or preform charges 128 for use in molding composite parts in accordance with the exemplary method as shown in the flowchart of FIG. 5 and as described below. However, it is noted that order of operations described herein is permutable.

First, as shown in FIG. 5 and referring to the ultrasonic manipulator 100 of FIGS. 1-4, in step S101, the pair of paddles 112, 114 of the end effector 102 grasp a preform/towpreg 126 for processing. This preform/towpreg 126 is created in one or more separate operations by a separate system and is intended to mean any preform or towpreg that would operate within the boundaries of the present invention. The paddles 112, 114 of the end effector 102 may grab the preform/towpreg 126 immediately after the preforming/bending stage by a preformer.

Next, the ultrasonic inspection device 108 of the ultrasonic manipulator 100 inspects the preform/towpreg 126 utilizing known technology. As shown in step S102, the ultrasonic inspection device 108 preferably utilizes sonotrodes 116 to accomplish the inspection. In particular, the preform/towpreg 126 may be inspected to verify proper bonding between the fibers and resin, and detect for any voids, inclusions, cracks, or other defects. The volume of the preform/towpreg 126 may be the volume held between the paddles 112, 114 so that inspection may be a sampling of the entire preform/towpreg 126. If the ultrasonic inspection reveals critical defects that fall above a specified defect threshold, the preform/towpreg 126 is moved to a "scrap" area, as shown in step S103.

Assuming the preform/towpreg 126 is acceptable, i.e., it passes the inspection step S103, an ultrasonic blade of the ultrasonic cutting device 104 is then introduced at the end of a grasping edge of the pair of paddles 112, 114 while the preform/towpreg 126 is held by the paddles 112, 114. The ultrasonic blade cuts off a preform 124 from the preform/towpreg 126 (step S104). The preform 124, now detached from the preform/towpreg 126, is held at its end by the paddles 112, 114 of the end effector 102. In some embodiments, the ultrasonic manipulator 102 may heat up an end of the preform 124 and, by exerting pressure via the paddles 112, 114, the end of the preform 124 is appropriately reshaped (step S105), for example, being "spread" so that it is thinner, facilitating incorporation in a mold (that will ultimately mold the one or more preforms 124 into a final part).

In some embodiments, as shown at step S106, after shaping, the end effector 102 may use its machining device 106 or move the preform 124 to a machining area. In the machining area, a separate milling tool head may be used. Machined features in the preform 124 may be provided as appropriate. This is done, for example, to change the shape of the preform 124 to match the part design and fit with a mold.

After the machining step (step S106), the preform 124 is moved by the end effector 102 to an assembly area. The operations of grasping (step S101), inspecting (step S102), cutting (step S104), shaping (step S105), and machining (step S106) are repeated until a specified number of preforms 124 (based on the part design) have been added to the assembly area. The end effectors 102 may then be used to grab multiple preforms at once for assembly (step S107). The preforms 126 are then ultrasonically welded together, as the end effectors 102 are pressing against them. A bonding/welding operation (step S108) utilizing ultrasonic bonding device 110 occurs at the common surfaces of the preforms 126 (see FIG. 1) so that all preforms 124 are tacked together to create a preform charge 128. If multiple preforms 124 don't fit well within the original paddles 112, 114 (used for grasping and cutting the shapes), the original paddles can be interchanged for a larger set of paddles, or paddles having a different shape, using a pick-and-place module. The preform charge 128 is then placed into an injection mold (step S109).

Multiple ultrasonic manipulators 100 utilizing multiple end effectors 102, 102A, 102B (see FIG. 1) of the present invention can be used on a single processing line to increase the throughput and efficiency of the process. For example, one ultrasonic manipulator 100 may be gripping the object while another ultrasonic manipulator is cutting. In some other embodiments, one ultrasonic manipulator 102 inspects one portion of a preform 124 while another portion of the preform 124 is being spot bonded/welded to another preform 124 by a different ultrasonic manipulator 102.

The preform/towpregs 126 and preforms 124 can take any shape and size. As a result, the paddles 112, 114 for the ultrasonic manipulator 102 will have various shapes and sizes. The paddles 112, 114 can be serrated, grooved, roughened, or flat depending on the object being picked up. In some embodiments, the surface of the paddles 112, 114 are scalloped to better assist picking up one or more circular or cylindrical objects.

In some embodiments, the paddles 112, 114 may include air/vacuum suction to prevent damaging the preforms 124 from the pinching action and to allow for quickly picking up and dropping off the preforms 124.

The opening and closing mechanism for the paddles 112, 114 can be a hinge 330 or series of hinges. The hinges 330 may be powered via stepper motors, pneumatics, magnets, and the like.

The ultrasonic inspection device 108 and inspection step (step S102) may occur on a small section of the preform 124. In some other embodiment, the paddles 112, 114 can also move along the entire shape of the preform 124 to do a full inspection on the preform 124. In yet another embodiment, the size of the paddles 112, 114 could match the size of the preform 124 so that the entire perform 124 can be inspected in one step.

The cutting blade of the ultrasonic cutting device 104 can move through a channel or groove 232 within the paddles 112, 114, similar to how electrosurgical laparoscopic instruments are used. With the laparoscopic instrument, the cutting groove 232 is in the middle of the paddles 112, 114 so that the distal, cut section and the proximal remaining section are still being gripped after cutting. However, for embodiments of the present invention, the channel 232 is situated at the distal edge of the paddles 112, 114. If the cutting channel 232 were in the middle of the paddles 112, 114, then the paddles would be gripping both the end cut section of the preform 124 and the remaining section after a cut. By locating the cutting channel 232 at the far (distal) edge of the paddles 112, 114 in accordance with the illustrative embodiment, the grasping mechanism only grips the cut section after the cut, making it easier to directly transfer this preform 124 to the next step.

The movement of the cutting blade of the ultrasonic cutting device 104 can be powered by a motor, electrical pulley system, pneumatics, or like.

The shaping step (step S105) can occur at different areas of the preform 124 (not only at the end of the preform 124 as previously discussed). If another area of the preform 124 requires shaping, then the ultrasonic manipulator 100 can move to this other area, or another ultrasonic manipulator can be used to shape the preform 124 as it's held by the original ultrasonic manipulator 100.

The machining step (step S106) can occur by flipping up the paddles 112, 114 and exposing the cutting blade of the ultrasonic cutting device 104. The cutting blade can be powered by a rotary motor, and the spinning ultrasonic blade can be used to machine/mill the preform 124. In another embodiment, a separate milling tool head can be used. The separate milling head can also be ultrasonic, but not necessarily so. The milling tool head can reside on a separate motion system, or the end effector 102 with the ultrasonic manipulator 100 can be switched out to a milling end effector using an automated tool changer (in a similar fashion to tool changers used on CNC systems).

Machining using machining device 106 (step S106) can be used to adjust the preform 124 shape so that it will fit with other preforms 124 or with the mold itself. In this manner, machining can be used to create specific features, such as lock-and-key mechanisms. It can also be used to bring a preform 124 or preform charge 128 into geometric tolerance.

One or more of the steps described in this invention can be omitted or left out when creating a composite product. For example, if the quality of preform 124 is not critical (or has been previously tested), the inspection step may be omitted. Similarly, if a preform shape already matches the mold design after the preforming step, then the shaping step (step S105) and machining step (step S106) may be omitted. Also, if only one preform 124 is used in a mold then the bonding/welding step (step S108) may be omitted. Cutting, machining, forming, bonding, and inspection do not need to all occur when creating a composite product.

The steps described in this invention do not have to be in the order described. For example, the machining step (step S106) could occur after the bonding/welding step (step S108) once the preforms 124 are bonded together as a preform charge 128. In another embodiment, the inspection step (step S102) could be done anywhere in the process and/or in multiple steps during the process. In yet another embodiment, the shaping step (step S105) could occur on the preform charge 128 (after the preforms 124 have been bonded together).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. An ultrasonic manipulator for processing three-dimensional composite preforms, comprising at least one end effector, the end effector comprising:
   (a) an ultrasonic inspecting device;
   (b) an ultrasonic cutting device;
   (c) an ultrasonic machining device; and
   (d) an ultrasonic bonding device,
   wherein the ultrasonic manipulator is adapted to utilize the inspecting device, the cutting device, the machining device and the bonding device serially.

2. The ultrasonic manipulator of claim 1, wherein the end effector comprises a pair of paddles.

3. The ultrasonic manipulator of claim 1, wherein the ultrasonic manipulator further comprises a pick-and-place system.

4. The ultrasonic manipulator of claim 2, wherein the pair of paddles include at least one sonotrode, transmitter and receiver.

5. The ultrasonic manipulator of claim 1, wherein the end effector includes a milling tool head.

* * * * *